United States Patent
Wickman et al.

(10) Patent No.: US 6,177,676 B1
(45) Date of Patent: Jan. 23, 2001

(54) DEVICE AND SENSITIVE MEDIUM IN MEASURING OF A DOSE ABSORBED IN AN IONIZING RADIATION FIELD

(76) Inventors: Göran Wickman, Skidspåret 13, S-903 38, Umeå ; Thord Holmström, Ostibyn 45, S-922 66, Tavelsjö, both of (SE)

(*) Notice: Under 35 U.S.C. 154(b), the term of this patent shall be extended for 0 days.

(21) Appl. No.: 09/117,435

(22) PCT Filed: Jan. 22, 1997

(86) PCT No.: PCT/SE97/00097
§ 371 Date: Jul. 30, 1998
§ 102(e) Date: Jul. 30, 1998

(87) PCT Pub. No.: WO97/28462
PCT Pub. Date: Aug. 7, 1997

(30) Foreign Application Priority Data

Feb. 1, 1996 (SE) .................................................. 9600360

(51) Int. Cl.[7] .................................................. H01J 47/02
(52) U.S. Cl. .................................... 250/389; 250/374
(58) Field of Search .................................... 250/389, 374

(56) References Cited

U.S. PATENT DOCUMENTS 3,898,465 * 8/1975 Zaklad et al. ........................ 250/389
4,810,893 * 3/1989 Meertens ............................ 250/385.1
5,041,730 * 8/1991 Attix .................................. 250/385.1
5,079,427 * 1/1992 Vlasbloem ............................ 250/374

FOREIGN PATENT DOCUMENTS 195 03 647 A1    8/1996 (DE) .
2 134 703 *       8/1984 (GB) .................................. 250/374

* cited by examiner

Primary Examiner—Constantine Hannaher
(74) Attorney, Agent, or Firm—Pillsbury Madison & Sutro LLP

(57) ABSTRACT

The present invention relates to a device for measuring an absorbed dose in an ionizing radiation field, and to a sensitive medium for use in an ionization chamber. The device includes a detector body (11) which is of the ionization chamber type and comprises two mutually spaced electrode elements (20, 30) and means (50) which together with the electrode elements delimit in the detector body a measuring first chamber (40) for a sensitive medium. A second chamber (60) is disposed in spaced relationship with the measuring chamber, and a flow channel (61) extends through one of the electrode elements such as to connect the measuring chamber with the second chamber. The sensitive medium is a liquid. According to the invention, the sensitive medium is a mixture of isooctane ($C_8H_{18}$) and tetramethylsilane ($Si(CH_3)_4$).

14 Claims, 4 Drawing Sheets

DEVICE AND SENSITIVE MEDIUM IN MEASURING OF A DOSE ABSORBED IN AN IONIZING RADIATION FIELD

This application is the national phase of international application PCT/SE97/00097 filed Jan. 22, 1997 which designated the U.S.

BACKGROUND OF THE INVENTION

The present invention relates to a device and to a sensitive medium for measuring an absorbed dose in an ionizing radiation field. More particularly, the invention relates to a device for determining the magnitude of the absorbed dose at a specific point in a material where the interaction of the radiation with the material resembles the interaction of the radiation with living tissue. The present invention also relates to the use of a sensitive medium, such as a suitable fluid mixture, in such a device.

By absorbed dose is meant the energy that is delivered by the ionizing radiation per unit of mass of the radiated material. The unit of an absorbed dose is the gray, abbreviated herein as Gy (J/kg).

With view to patient safety, for instance in connection with medical radiation treatment and radiological diagnosis, it is of paramount importance to be able to anticipate the biological effects on living human tissue that is subjected to radiation in an ionizing radiation field. In this regard, it is desirable to be able to predict the dose absorbed and its distribution in human tissue before irradiating the tissue. It is of interest to measure the delivery of the ionized radiation at different proximate points, so as to map the ionizing radiation field. Patient safety can be enhanced by accurate and repeated mapping of the radiation field in treatment apparatus.

Examples of ionizing photon radiation fields and electron radiation fields that are relevant in medical treatment and radiological diagnosis are photon and electron radiation fields in the energy range of from 30 keV to 50 MeV. A dose rate interval of interest in continual radiation is from 0.1 mGy/min. to 10 Gy/min. and in the case of pulsed radiation with microsecond pulses, an absorbed dose per pulse of up to 5 mGy/pulse and a pulse repetition frequency of up to 1,000 pulses per minute. By dose rate is meant the rate at which the dose grows, i.e. the energy delivered per unit of mass and per unit of time.

The energy deposited/dose absorbed by a patient in computerized tomography, for instance, can be predicted by providing an artificial body that includes a tissue-like material (normally water) with detectors and subjecting said body to the ionizing radiation field. With the use of good detectors, the absorbed dose and its distribution can be interpreted from signals from the detectors, combined with the knowledge of the placements of said detectors. When a patient is then subjected to the same radiation field under generally the same conditions (inter alia energy and time), the dose delivered to the patient can be predicted.

The most common type of detector at present within the described field of application is an ionization chamber that uses a gas as the sensitive medium. The ionization chamber operates on the principle of irradiating a chamber-enclosed sensitive medium, wherein ions are released in proportion to the energy delivered as a result of the interaction of the radiation with the gas. These ions are captured via an electric field generated between two electrodes. The captured charge can then be measured and used to determine the size of the dose absorbed in the sensitive medium.

One drawback with these detectors is their size, more specifically the size or volume required to enable the gas to be used as a sensitive medium with sufficient accuracy. Furthermore, since the detector responds to the total amount of energy deposited in the sensitive medium, local energy spikes in the radiation field will be concealed, therewith rendering the detector unusable or unreliable when such variations in energy density are found in the ionizing radiation field. Variations that occur in radiation fields derive from many present-day radiation sources. For instance, there can occur points in the patient's tissue where the dose actually absorbed differs widely from the predicted dose.

Semi-conductors diodes are examples of other conventional detectors. These detectors operate on the principle whereby the ionizing radiation generates free charges in the p-n-junction of the diodes. Similar to the ionization chamber technique, this charge can then be used to determine the dose absorbed.

A common feature of these types of detector is that there is measured an electric current or charge that is proportional to the dose rate and the absorbed dose respectively. The measuring result can thus be registered directly during or immediately after irradiating the detector.

Another class of detectors for measuring absorbed dose are those which enable registration of a change in the detector material caused by radiation, subsequent to irradiating the detector. One example of the latest type of detector is the so-called Fricke dosimeter, which uses spectrophotometric evaluation of the irradiated liquid. One drawback with detectors of this type is that they cannot be made sufficiently small with the sensitivity required in the application that we have described in this document.

Another type of detector is the so-called thermoluminescence dosimeter which utilizes the phenomenon that irradiation of certain materials causes a specific amount of electrons excited by the radiation to remain in the material in their excited state. When the irradiated material is subsequently heated, the electrons are de-excited and the quantity of light thus generated is proportional to the dose absorbed by the material under certain conditions.

These latter detectors do not permit a dose response to be read directly, and the proportionality between emitted signal and absorbed dose in water varies in the best of cases by about 40% in the given energy range. The semiconductor detector can be produced in small units (only some millmeters) and has a variation of about 500% in its response in the aforesaid energy range of interest. Such variations are unsatisfactory.

The need of reliable and sensitive detectors in the photon energy range of 30–200 keV that also have a limited extension in space is particularly obvious when the purpose of such detectors is to determine absorbed doses and dose distribution around small radioactive radiation sources intended for implantation in cancer tumours for radio therapy (interstitial radio therapy), a tumour treatment form that has been revived in recent years.

Another important field of application is one of determining the size of the absorbed dose and its distribution in patients undergoing computerized tomography. In Sweden, as in most other countries, it is a statutory requirement that doses are measured at regular time intervals, to guarantee safety of the patients.

The object of the present invention is to provide a device for measuring doses absorbed in a material that is subjected to ionizing radiation, particularly in a tissueimitating material.

A further object is to provide a device that a) has a radiation sensitive volume that is small in relation to the variation of the absorbed dose in space. In practice, this means that the sensitive volume of the detector will preferably not have in any direction an extension that exceeds a few millimeters. Certain applications require the sensitive volume to have an extension of less than some tenths of a millimeter in at least one direction;

b) by its presence in an irradiated material only negligibly disturbs or perturbates the radiation field that would otherwise be available;

c) ensures that the proportionality between measuring signal and the absorbed dose in the material where measuring shall take place is not noticeably changed with variations in the energy spectrum of the radiation (radiation quality variations);

d) does not permit the proportionality between measuring signal and absorbed dose to vary markedly with the dose rate or the size of the absorbed dose; and that e) it ensures that the accuracy in determining the absorbed dose, particularly in the case of measurements on which radio therapy is to be based, is greater than some percent.

If condition c) is not fulfilled, accurate knowledge of the radiation energy spectrum is required in order to measure the dose reliably. Energy spectra often vary in the voids in an irradiated object and are equally as difficult to determine as the absorbed dose.

These and other objects of the invention are achieved with an inventive device defined in the characterizing clauses of respective Claims.

SUMMARY OF THE INVENTION

An inventive device for measuring absorbed doses in an ionizing radiation field comprises an ionization chamber type detector body that includes two mutually spaced electrode elements and means which together with said electrode elements define in the detector body a measuring chamber for a sensitive medium, wherein the device also includes a second chamber that is spaced from the measuring chamber and a cross-flow passage that extends through one of the electrode elements and connects the measuring chamber with the second chamber, wherein the sensitive medium is a liquid.

The second chamber may include therein means for taking-up changes in volume of the sensitive medium.

When making a comparison between gas and liquid, the high density of the liquid permits a volume that is several hundred times lower with the same sensitivity when used as the sensitive medium in the detector; this volume being a critical factor in the accuracy of the detectors, as before described. However, the disadvantage with those liquids that have been tested in ionization chambers is that they do not deliver signals of satisfactory stability in time and throughout the whole of the energy range of interest. Neither have they shown stable calibration factors throughout the whole of this range.

We have now discovered a liquid mixture that surprisingly improves all of these factors. The sensitive medium is comprised of a liquid that includes isooctane, ISO, (2-2-4-Trimethylpentane, $C_8H_{18}$) and tetramethylsilane, TMS, (Si$(CH_3)_4$). A particularly preferred mixture comprises two parts of ISO and one part of TMS. By parts is meant parts by volume.

The invention will now be described in more detail with reference to preferred exemplifying embodiments thereof and with reference to the accompanying drawings, in which corresponding components have been designated the same reference signs.

DETAILED DESCRIPTION

Figure 1:
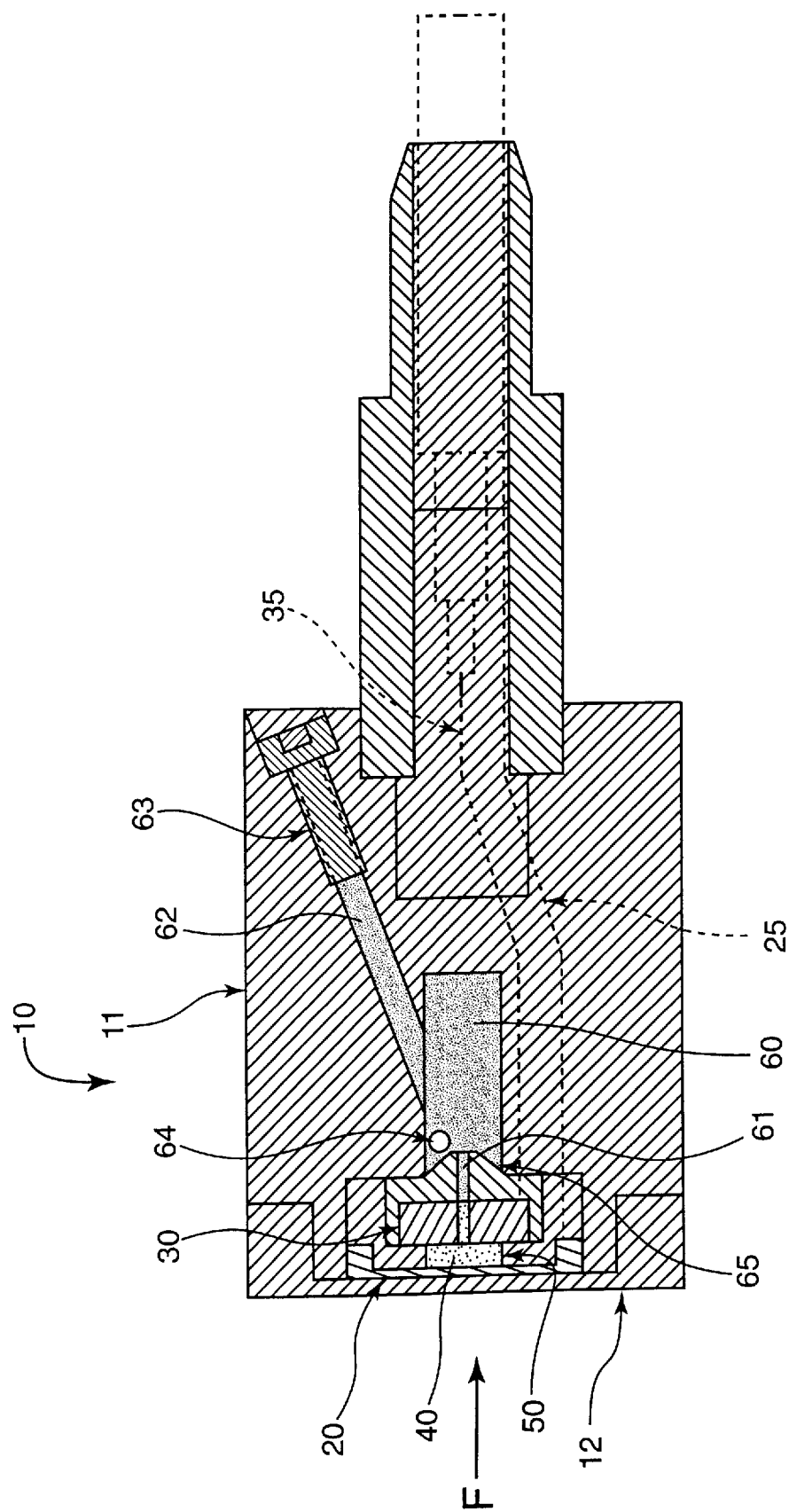
FIG. 1 is a sectional view of a detector according to a first embodiment of the present invention.

FIG. 1 illustrates an ionization-chamber type detector 10 according to a first embodiment of the invention. The detector includes a generally cylindrical body 11 that has a first planar end surface 12. Two generally disc-shaped electrodes 20 and 30 are mounted slightly inwardly of said surface and parallel therewith. The two electrodes are plane parallel and spaced from one another. The ionizing radiation field is intended to fall on said end surface 12; see arrow F.

Located between the electrodes is a chamber 40 which accommodates the sensitive medium of the detector. The chamber 40 is delimited peripherally by a curved wall 50 which extends between the electrodes 20, 30 and which is comprised of an electrically nonconductive material. The wall material also withstands the chemical effect of the sensitive medium and the ionizing radiation. The wall material is preferably an insulating styrene copolymer, e.g. Rexolite®.

The electrodes are connected to a known apparatus capable of delivering voltage to the electrodes, through the medium of respective conductors 25 and 35 extending through the body, and to read the response from a delivered dose. Since such an apparatus is well known within ionization chamber technology, it will not be described further in this document.

The electrode 20 that is first met by the ionized radiation field, to the left in the Figure, is a high-voltage electrode and the other electrode 30 is a collecting electrode. The field strength between the electrodes varies from 0.3 to 3 MV/m. With respect to measuring precision, this field strength is optimal with regard to dose rate and liquid layer thickness.

The body also includes a further chamber 60 which accommodates the sensitive medium. The second chamber is located inwardly of the first chamber 40, as seen from the end wall 12. The two chambers 40 and 60 are in flow communication with one another through the medium of a flow passage 61. In the illustrated, particularly preferred embodiment, the passage extends through the collector electrode 30.

The sensitive medium used in the present invention is a liquid, which in the illustrated embodiment is introduced into the device through a passageway 62 that extends from the rear part of the detector body. The inlet orifice of the passageway is preferably closed by a threaded plug.

Because the detector is subjected to temperature variations when in operation, temperature-related variations in volume of the enclosed liquid create a problem. Pronounced increases in volume are liable to pressurize the detector body and result in leakage. This problem is resolved, by including a gas bubble 64 in the liquid accommodated in the second space 60. The gas bubble takes-up variations in the volume of the liquid and therewith eliminates the leakage risk.

In order to prevent the gas bubble from penetrating into the first chamber, a gas lock 65 is provided in the flow passage, preferably at or around the passage orifice into the second chamber. The gas lock may, for instance, have the form of a constriction that prevents the gas bubble penetrating into the flow passage 61.

In the case of the present invention, the detector body is rotationally symmetrical about a centre axis, with the exception of the passageway 62 and the conductor connections 25 and 35. Other configurations are conceivable within the scope of the invention, however. The body 11 may be comprised of any desired number of parts, for instance may be a singlepiece moulded structure or, as in the case of the FIG. 1 embodiment, assembled from a plurality of mutually separate parts comprised of one or several materials.

The body 11 of the FIG. 1 embodiment is comprised of four machined parts, all of which are comprised of one and the same material, Rexolite®.

The electrodes 20 and 30 are graphite electrodes, the sensitive medium is a liquid, and the gas in the bubble 64 is air.

Figure 2:
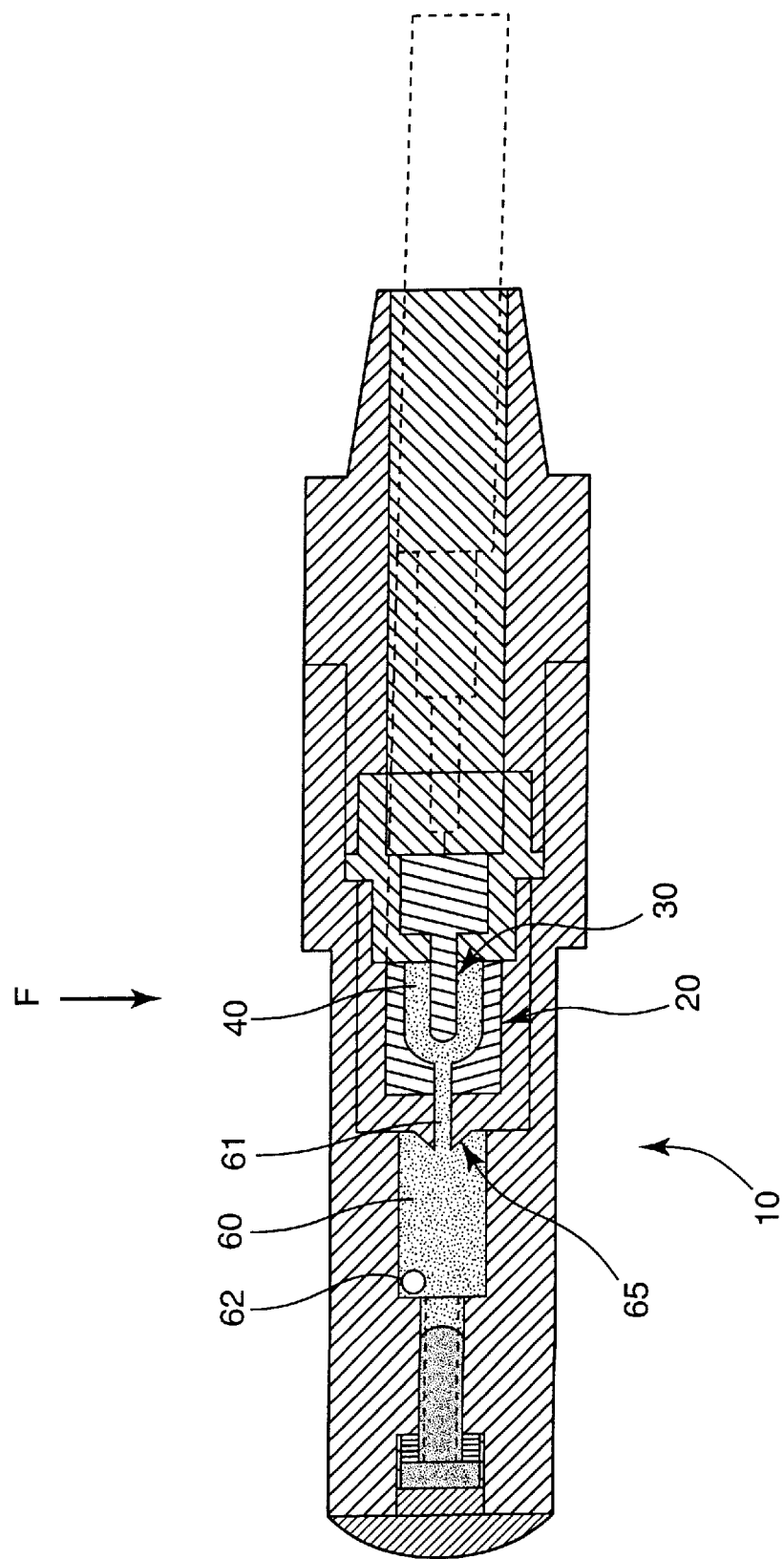
FIG. 2 is a sectional view of a detector according to a second embodiment of the present invention.

FIG. 2 illustrates another embodiment of the inventive detector. The detector of this embodiment also includes a body 11 that is generally rotationally symmetrical about a centre axis and which is comprised of several parts. The electrodes are disposed coaxially and comprise an outwardly positioned high-voltage electrode 20 and a generally rod-shaped collector electrode 30. The high-voltage electrode 20 includes an aperture or hole that extends coaxially with said centre axis and into which the rod-shaped collector electrode 30 extends. In this way, there is formed between the electrodes an essentially tubular first space or chamber 40 for accommodating the sensitive medium in said device. The collector electrode does not extend to the bottom of the recess and the sensitive medium will therefore also surround the tip of the collector electrode 30 projecting into said chamber.

Similar to the preceding embodiment, the device includes conductors for connecting the electrodes to apparatus suitable for the purpose intended.

A second sensitive-medium accommodating chamber 60 which is distanced from the first chamber 40 in the direction of said centre axis. In the case of the illustrated embodiment, the second chamber 60 is located forwardly of the chamber 20 as seen in a direction from the collector electrode 30. A flow passage 61 extends between the two chambers. A bubble lock 65 is provided in the proximity of the flow passage and functions to prevent a gas bubble 62 present in the sensitive medium in the second chamber 60 from migrating to the first chamber 40. In this embodiment, the flow passage extends through the high-voltage electrode 20.

This embodiment is intended to receive a radiation field that falls on the first chamber 40, essentially at right angles to the centre axis of the detector body, although at any point whatsoever around the periphery of the body. Consequently, the body surface on which the radiation field can impinge will form a band around the detector body.

It will be understood that the described embodiments of the present invention have been given solely by way of example and that the invention also encompasses detectors of mirror-image constructions, for instance, and detectors constructed with other geometrical configurations.

According to one particularly preferred embodiment of the present invention, the sensitive medium is a liquid that includes isooctane, ISO, ($C_8H_{18}$) and tetramethylsilane, TMS, ($Si(CH_3)_4$). In trials carried out on sensitive medium consisting of mixtures of TMS and ISO, we arrived at a practically constant ratio between measuring signal and absorbed dose throughout the entire photon energy range, 30-200 keV, of interest for medical purposes, the detector being used to determine the dose absorbed by an aqueous body and bodies of other tissue-imitation material.

Figure 3:
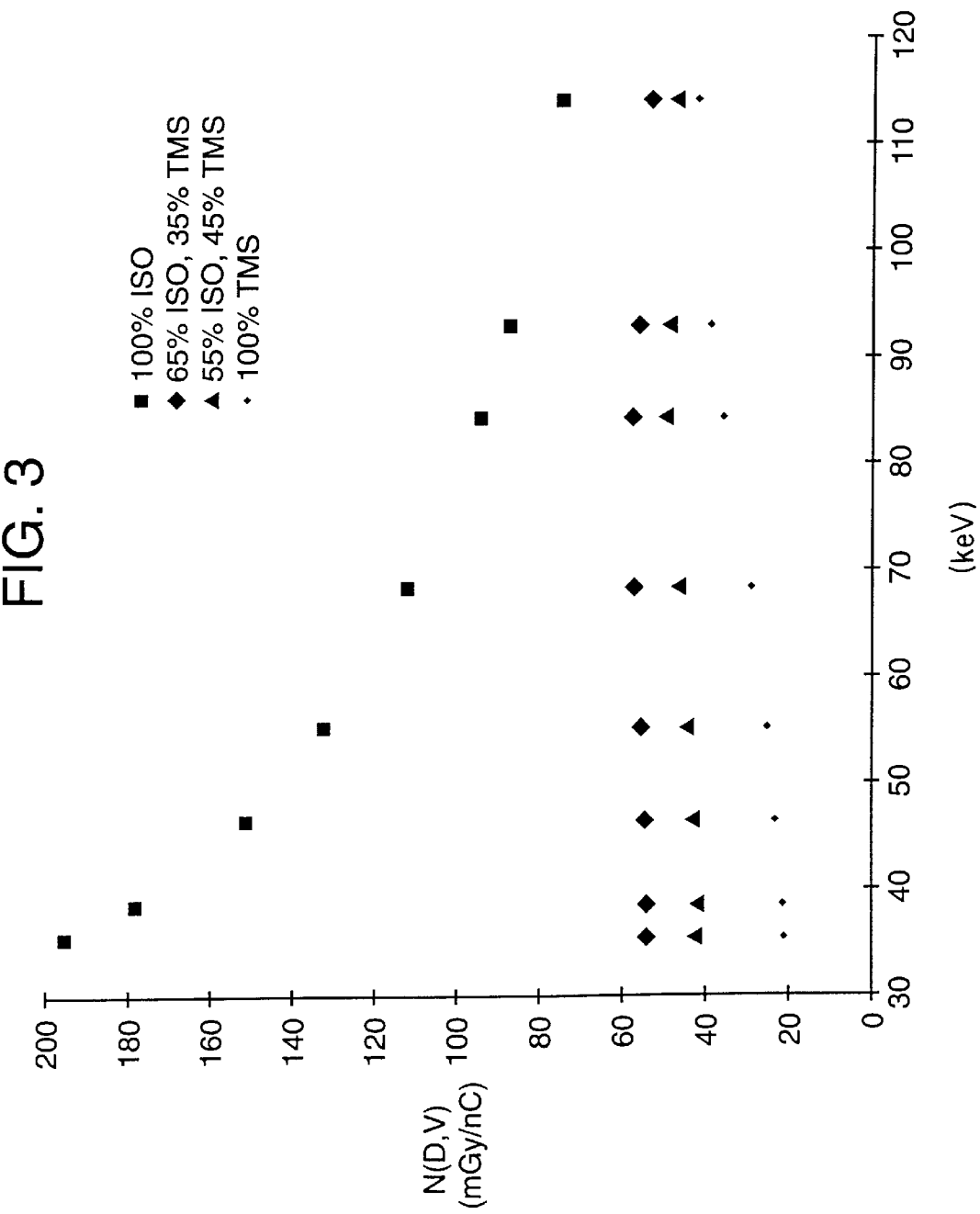
FIGS. 3 and 4 are graphs illustrating results of trials using different liquid mixtures as a sensitive medium and carried out with the detector shown in FIG. 2.

The curves in FIG. 3 illustrate the energy dependency of a calibrating factor N(D,V), the Y-axis, within a low energy photon range of from 30 to 120 keV, the X-axis, for four different liquids used as sensitive medium. The calibration factor N(D,V) is expressed as water absorbed doses divided by the amount of charge collected. With regard to the usefulness and reliability of the detector, there is preferred a sensitive medium that has a calibration factor which is insensitive to energy variations. It will be seen from the Figure that a mixture of 65% ISO and 35% TMS has particularly good properties.

Figure 4:
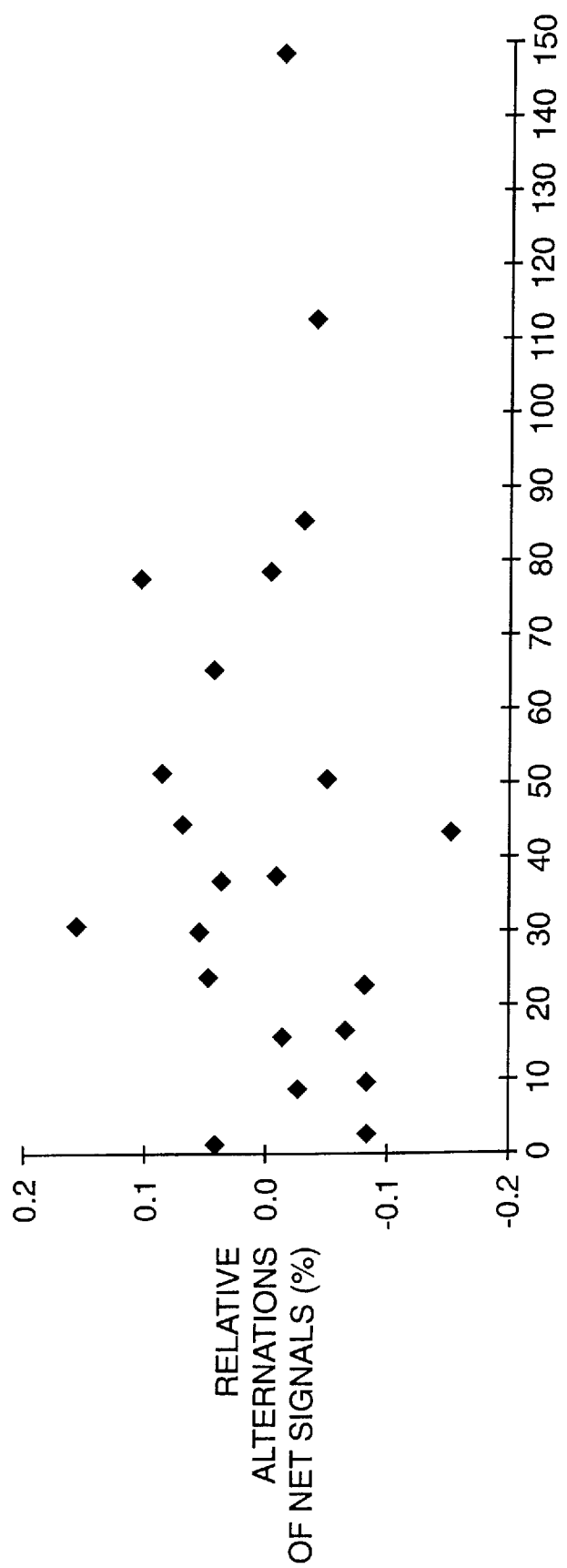

The optimal mixture was subjected to a reproducibility test in an inventive detector, wherewith it was found that the mixture also gave, unexpectedly, a better result than other mixtures of ISO and TMS. FIG. 4 illustrates the result of one such test, wherein the relative change in response, net signal, from an inventive sensitive medium consisting of 65% ISO and 35% TMS was tested over a period of 150 calendar days. The polarization voltage used was −300V and the measurements were made in air with Co-60 as a radiation source and at a dose rate of about 1 mGy/min. at the measuring point. The relative change in response lay within +/−0.2% during the trial period, which must be considered as being very low.

What is claimed is:

1. A device for measuring absorbed doses in an ionizing radiation field, wherein the device comprises:
    an ionization chamber detector body comprising two mutually spaced electrode elements and chamber walls which together with the electrode elements in the detector body delimit a measuring first chamber for accommodating a sensitive medium;
    a second chamber which is disposed in spaced relationship with said measuring chamber; and
    a flow passage which extends through one of the electrode elements and connects the measuring first chamber with said second chamber,
    wherein the sensitive medium is a liquid.

2. A device according to claim 1, further comprising means for taking-up changes in volume of the sensitive medium.

3. A device according to claim 1, wherein the electrode elements are plane parallel and generally disc-shaped.

4. A device according to claim 1, wherein the two electrode elements further comprise a first electrode element disposed in an aperture provided in an aperture provided in and surrounded peripherally by a second electrode element.

5. A device according to claim 4, wherein the flow passage is disposed in the second electrode element.

6. A device for measuring absorbed doses in an ionizing radiation field, wherein the device comprises:
    an ionization chamber detector body comprising two mutually spaced electrode elements and chamber walls which together with the electrode elements in the detector body delimit a measuring first chamber for accommodating a sensitive medium;
    a second chamber which is disposed in spaced relationship with said measuring chamber;
    a flow passage which extends through one of the electrode elements and connects the measuring first chamber with said second chamber; and a gas bubble adapted to take up changes in volume of the sensitive medium,
wherein the sensitive medium is a liquid.

7. A device for measuring absorbed doses in an ionizing radiation field, wherein the device comprises:
- an ionization chamber detector body comprising two mutually spaced electrode elements and chamber walls which together with the electrode elements in the detector body delimit a measuring first chamber for accommodating a sensitive medium;
- a second chamber which is disposed in spaced relationship with said measuring chamber;
- a flow passage which extends through one of the electrode elements and connects the measuring first chamber with said second chamber; and
- an air bubble adapted to take up changes in volume of the sensitive medium, wherein the sensitive medium is a liquid.

8. A sensitive medium accommodated in an ionization chamber, said sensitive medium comprises a mixture of isooctane ($C_8H_{18}$) and tetramethylsilane ($Si(CH_3)_4$).

9. A sensitive medium according to claim 8, wherein said sensitive medium comprises a mixture of ⅔ in volume of isooctane (2-2-4-Trimethylpentane, ($C_8H_{18}$)) and ⅓ in volume of tetramethylsilane ($Si(CH_3)_4$).

10. A sensitive medium according to claim 8, wherein said sensitive medium comprises 65% isooctane and 35% tetramethylsilane.

11. An ionization chamber, comprising:
- a sensitive medium accommodated in the ionization chamber, the sensitive medium comprising a mixture of isooctane and tetramethylsilane; and
- a gas bubble disposed in fluid communication with the sensitive medium.

12. An ionization chamber as in claim 11, wherein the gas bubble is air.

13. An ionization chamber as in claim 11, wherein the mixture comprises ⅔ in volume of isooctane and ⅓ in volume of tetramethylsilane.

14. An ionization chamber as in claim 11, wherein the mixture comprises 65% isooctane and 35% tetramethylsilane.

* * * * *